Oct. 13, 1964 R. H. EICHORN ETAL 3,152,757
XEROGRAPHIC CONTROL APPARATUS
Original Filed Dec. 28, 1961 7 Sheets-Sheet 1

FIG. 1

INVENTORS
ROGER H. EICHORN
ROBERT F. OSBORNE
BY
ATTORNEY

FIG. 2

INVENTOR.
ROGER H. EICHORN
ROBERT F. OSBORNE
BY
ATTORNEY

FIG. 3

INVENTOR.
ROGER H. EICHORN
ROBERT F. OSBORNE
ATTORNEY

FIG. 4

Oct. 13, 1964 R. H. EICHORN ETAL 3,152,757
XEROGRAPHIC CONTROL APPARATUS
Original Filed Dec. 28, 1961 7 Sheets-Sheet 5

INVENTOR.
ROGER H. EICHORN
ROBERT F. OSBORNE
BY
ATTORNEY

FIG. 11

3,152,757
XEROGRAPHIC CONTROL APPARATUS
Roger H. Eichorn and Robert F. Osborne, Webster, N.Y., assignors to Xerox Corporation, Rochester, N.Y., a corporation of New York
Original application Dec. 28, 1961, Ser. No. 162,837, now Patent No. 3,099,944, dated Aug. 6, 1963. Divided and this application Aug. 9, 1963, Ser. No. 301,166
3 Claims. (Cl. 235—91)

This invention relates in general to xerography and, in particular, to an improved counter mechanism for use in a xerographic reproducing apparatus. This application is a division of copending Eichorn et al. application, Serial No. 162,837, now Patent No. 3,099,944, filed December 28, 1961.

More specifically, the invention relates to an improved counted mechanism for use in a xerographic reproducing apparatus to count the number of reproductions made by the apparatus.

Unlike certain types of reproducing mechanisms in which a reproduction is made during each full cycle of rotation of a printing cylinder, in xerographic apparatus of the type disclosed in the above referenced Eichorn copending application, the xerographic drum will rotate through at least one revolution to first effect a reproducing cycle and then it will rotate through at least a second revolution to effect a timing out cycle.

Having the foregoing in mind, the principal object of this invention is to improve counter mechanisms for counting the reproductions actually made in xerographic reproducing apparatus.

Another object of this invention is to improve counter mechanisms so that a reproduction counter operates only during the reproducing cycles of a xerographic reproducing apparatus.

For a better understanding of the invention, as well as other objects and further features thereof, reference is had to the following detailed description of the invention to be read in connection with the accompanying drawings, wherein.

*General*

As shown, the xerographic apparatus comprises a xerographic plate including a photoconductive layer or light-receiving surface on a conductive backing and formed in the shape of a drum, generally designated by numeral 20, which is journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and, A drum cleaning station, at which the drum surface is first charged and then brushed or wiped to remove residual toner particles remaining thereon after image transfer, and at which the drum surface is exposed to a relatively bright-light source to effect substantially complete discharge of any residual electrostatic charge remaining thereon.

The charging station is preferably located as indicated by reference character A, in the schematic illustration of the apparatus. In general, the charging apparatus or corona charging device 21 includes a corona discharge array of one or more discharge electrodes that extend transversely across the drum surface and are energized from a high potential source and are substantially enclosed with a shielding member.

Next subsequent thereto in the path of motion of the xerographic drum is an exposure station B. This exposure station may be one of a number of types of mechanisms or members such as desirably an optical scanning or projection system, or the like, designed to project a line copy image onto the surface of the photoconductive xerographic drum from a suitable original.

The optical scanning or projection assembly consists of a copyboard in the shape of a drum, hereinafter referred to as copy drum 30, which is adapted to support copy to be reproduced and arranged to rotate in light-projection relation to the moving light-receiving surface of the xerographic plate. Uniform lighting is provided by suitable lamps 31 attached to a slotted light reflector 32 mounted adjacent to the copy drum.

A slotted light shield 33, adapted to protect the xerographic plate from extraneous light, is positioned adjacent to the surface of the xerographic plate. A slot aperture in the light shield extends transversely to the path of movement of the light-receiving surface of the xerographic drum 20 to permit reflected rays from the copy drum to be directed against a limited transverse area of the light-receiving surface as it passes therebeneath.

To enable the optical system to be enclosed within a relatively small cabinet, a folded optical system including an object mirror 34, a lens 35, and an image mirror 36, is used in the preferred embodiment of the apparatus.

A document fed through document guides 37 to the copy drum is removably secured thereon by a suitable gripper mechanism for movement therewith in timed relation to the movement of the xerographic drum whereby a flowing image of the copy is projected onto the xerographic drum. The copy is held against the surface of the copy drum until gripped by means of document retaining guides 38. Pressure guides 39 and document guard 41 retain and guide the trailing edge of the document on the copy drum. After the copy is scanned it is released from the copy drum to be transported out of the machine by the copy drum and document feed out rollers 42 through document feed out guide 43.

Adjacent to the exposure station is a developing station C in which there is positioned a developer apparatus 50 including a developer housing having a lower or sump portion for accumulating developer material 51. Mounted within the developer housing is a driven bucket-type conveyor 52 used to carry the developer material previously supplied to the developer housing to the upper portion of the developer housing from where the developer material is cascaded over a hopper chute 53 onto the drum.

As the developer material cascades over the drum, toner particles of the developer material adhere electrostatically to the previously formed electrostatic latent image areas on the drum to form a visible xerographic powder image; the remaining developer material falling off the peripheral surface of the drum into the bottom of the developer housing. Toner particles consumed during the developing operation to form the xerographic powder images are replenished by a toner dispenser 54, mounted within the developer housing.

Positioned next adjacent to the developing station is the image transfer station D, which includes suitable sheet feeding mechanism adapted to feed sheets of paper successively to the xerographic drum in coordination with the presentation of the developed image on the drum at the transfer station. The sheet feeding mechanism includes a sheet source, such as paper tray 60, for a plurality of sheets of a suitable support material that is, sheets of paper or the like, separator rollers 61 adapted to feed the top sheet of the stack of support material through a guide 67 to a sheet conveyor mechanism 62 having paper grippers 63 thereon which carry the sheet support material into contact with the rotating xerographic drum in coordination with the appearance of a developed image at the transfer station.

The transfer of the xerographic powder image from the drum surface to the support material is effected by means of a corona transfer device 64 that is located at or immediately after the point of contact between the support material and the rotating xerographic drum. The corona transfer device 64 is substantially similar to the corona discharge device that is employed at the charging station in that it also includes an array of one or more corona discharge electrodes that are energized from a suitable high potential source and extend transversely across the drum surface and are substantially enclosed with a shielding member. In operation, the electrostatic field created by the corona transfer device is effective to tack the tranfer material electrostatically to the drum surface and simultaneously with the tacking action, the electrostatic field is effective to attract the toner particles comprising the xerographic powder image from the drum surface and cause them to adhere electrostatically to the surface of the support material.

As the paper gripper mechanism continues to move forward in its closed circuit, it will strip the support material from the xerographic drum and carry it to a fixing device, such as, for example, heat fuser 70, whereat the devloped and transferred xerographic powder image on the support material is permanently fixed thereto.

After fusing, the finished copy is preferably discharged from the apparatus at a suitable point for collection externally of the apparatus. To accomplish this, there is provided a pair of delivery rolls 65 and 66, by means of which the copy is delivered from the machine after it is released by the gripper mechanism. Suitable cam means 68 and 69 are provided at the receiving and delivery stations of the conveyor mechanism, respectively, to actuate the paper grippers at these stations to receive or discharge a sheet of support material.

The next and final station in the device is a drum cleaning station E, whereat any powder remaining on the xerographic drum after the transfer step is removed and whereat the xerographic drum is flooded with light to cause dissipation of any residual electrical charge remaining on the xerographic drum.

To aid in the removal of any residual powder remaining on the xerographic drum there is provided a corona precleaning device 84 that is substantially similar to the corona discharge device that is employed at charging station A. Removal of residual powder from the xerographic drum is effected by means of a web cleaner device 80 adapted to continuously feed a clean fibrous web material into wiping contact with the xerographic drum. As shown, the web material 55 is taken from a supply roll 81 and transported around a cleaning or pressure roll 82, preferably made of rubber, onto a take-up or rewind roll 83.

Any residual electrical charge remaining on the xerographic drum is dissipated by light from a fluorescent lamp 85 mounted in a suitable bracket above the xerographic drum, a suitable starter and ballast being provided for energizing the fluorescent lamp.

Suitable drive means drive the xerographic drum, the copy drum, the sheet conveyor mechanism at predetermined speeds relative to each other, and to effect operation of the paper separator roll, and the web cleaner mechanism, the latter being driven at a speed or speeds whereby relative movement between the xerographic drum and the web material is effected. Suitable drive means are also provided for effecting operation of the conveyor mechanism and toner dispenser of the developing apparatus assembly.

It is believed that the foregoing description is sufficient for the purposes of this application to show the general operation of a xerographic reproducing apparatus. For further details concerning the specific construction of the xerographic apparatus shown, reference is made to copending application Serial No. 162,837 filed December 28, 1961 in the names of Roger H. Eichorn and Robert F. Osborne.

Referring now to the drawings, there is provided a frame for supporting the components of the apparatus formed by left-hand plate 10, intermediate plate 11 and right-hand plate 12, connected together and maintained rigidly in spaced relation to each other by suitable tie rods.

The xerographic drum 20, having a layer of photoconductive insulating material on a conductive backing, is mounted on horizontally driven shaft SH1, journaled in plates 11 and 12, respectively.

*Exposure Mechanism*

The exposure mechanism of the xerographic reproducing apparatus is designed to use an optical projection or scanning mechanism adapted to scan a document or copy wrapped around a rotating copy drum and to project a flowing image of the document or copy onto the photoconductive surface of the rotating xerographic drum.

As shown, the scanning mechanism includes a feeding station, a copy station, an exposure station, and means for moving the document through the copying station in synchronism with the movement of the xerographic drum.

The feeding station includes a document guide 37 extending between frame plates 10 and 11, through which a document or copy to be reproduced is moved forward into engagement with the copy drum 30 mounted on shaft SH2 and the document stops of the document retaining guide 38, the latter orientating and holding the document in position to be gripped by the gripper fingers of the copy drum.

Figure 3:
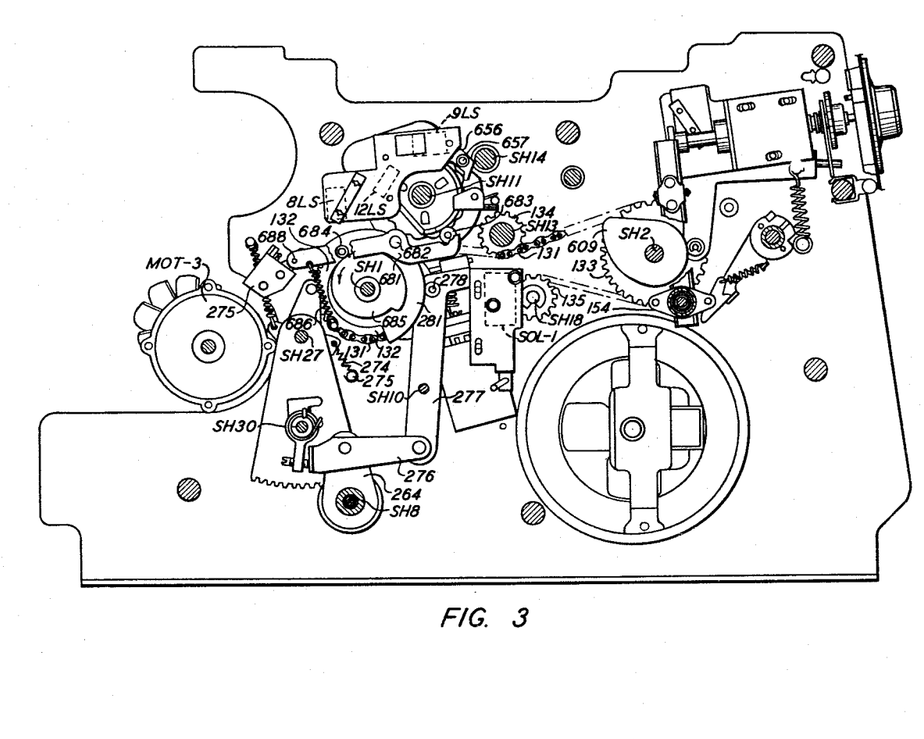
FIG. 3 is a sectional view of the apparatus taken on the opposite side of the intermediate frame plate.

The copy drum is driven in timed relation with the xerographic drum by means of chain 131 which runs on sprockets 132 and 133, fixedly mounted on shafts SH1 and SH2, respectively. As shown in FIG. 3, the chain 131 extends from sprocket 132, under sprocket 134 journaled on shaft SH13, around sprocket 133, over idler sprocket 135 journaled in stub shaft SH18, then back around sprocket 132.

Paper Feed System

The sheet feeding mechanism is positioned at the transfer station of the xerographic apparatus for seriatim feeding of cut sheet support material, such as paper or the like, into contact with the xerographic drum so that the developed powder image on the surface of the drum can be transferred to the support material. The sheet feeding mechanism consists of a tray 60 for holding a supply of cut sheet support material, separator rollers 61 for separating a single sheet of support material from the tray and forwarding it to a guide having a receiving slot in the front thereof and a movable gate to block the receiving slot so that the sheet can be arrested and held for delivery by a sheet conveyor mechanism.

The sheet of support material forwarded into the guide by the separator rollers is advanced by a sheet conveyor mechanism into contact with the xeropraphic drum adjacent to the corona transfer device whereat the powder image previously formed on the drum is transferred from the drum to the sheet of support material, the sheet of support material then being forwarded by the conveyor mechanism to the heat fuser for fusing of the powder image onto the sheet, and then to a set of delivery rolls which deliver the sheet of support material from the machine.

A supply of cut sheet support material, such as paper, to be fed one at a time to the sheet conveyor 62 is held in a paper tray 60 movably positioned at the front of the machine between the frame plates 10 and 11.

To feed sheets of support material one at a time from the paper tray to the guide for pick-up by the sheet conveyor, there is provided a paper feeding and separating means comprising intermittently driven separator rollers 61 mounted on a driven shaft SH9. The shaft SH9 is journaled at one end in bearing 251 mounted in one end of an outboard arm 252 and the opposite end or inboard end of the shaft is free to float within vertical limits in an inboard arm 249. The opposite end of the arms 249 and 252 are suitably secured, as by welding, to torque tube 253.

A weight 248 on the inboard end of shaft SH9 provides a force equal to the force on the outboard arm 252 thereby equalizing the force of the separator rollers when feeding paper. This floating arrangement of the shaft permits automatic compensation for irregularities in the separator roller and associated components, and for differences in paper stack height thereby assuring constant friction contact between the separator roller and the topmost sheet. Constant friction of the separator roller on the topmost sheet prevents possible skewing of the paper sheet being fed and assures proper relationship of the leading edge of the paper sheet as it is advanced forward into the guide 67.

Shaft SH9 is driven from shaft SH8 by means of belt 256 which runs on pulleys 257 and 258 fixedly mounted on shaft SH8 and SH9 respectively. Shaft SH9 is held in the arms 249 and 252 by the pulley 258 secured to the shaft outboard of arm 252 and by a retaining ring (not shown) positioned in a suitable groove in the shaft outboard of arm 249.

Shaft SH8 is journaled at one end in bearing 261 positioned in frame plate 10, and intermediate its ends by means of bearings (not shown) positioned within torque tube 253. The torque tube is rotatably positioned by means of flanged bearing 263 mounted in frameplate 11, whereby either the torque tube or the shaft SH8 can be rotated with respect to each other.

The torque tube 253 encircling shaft SH8 is thus mounted about the axis of this shaft to be oscillated by lever 264 fixed thereon, so that separator rollers 61 are moved by a control linkage described in detail hereinafter, from a first position out of contact with the sheets in the supply tray to a second position in which the separator rollers are moved in friction contact with the topmost sheet in the paper tray.

Figure 4:
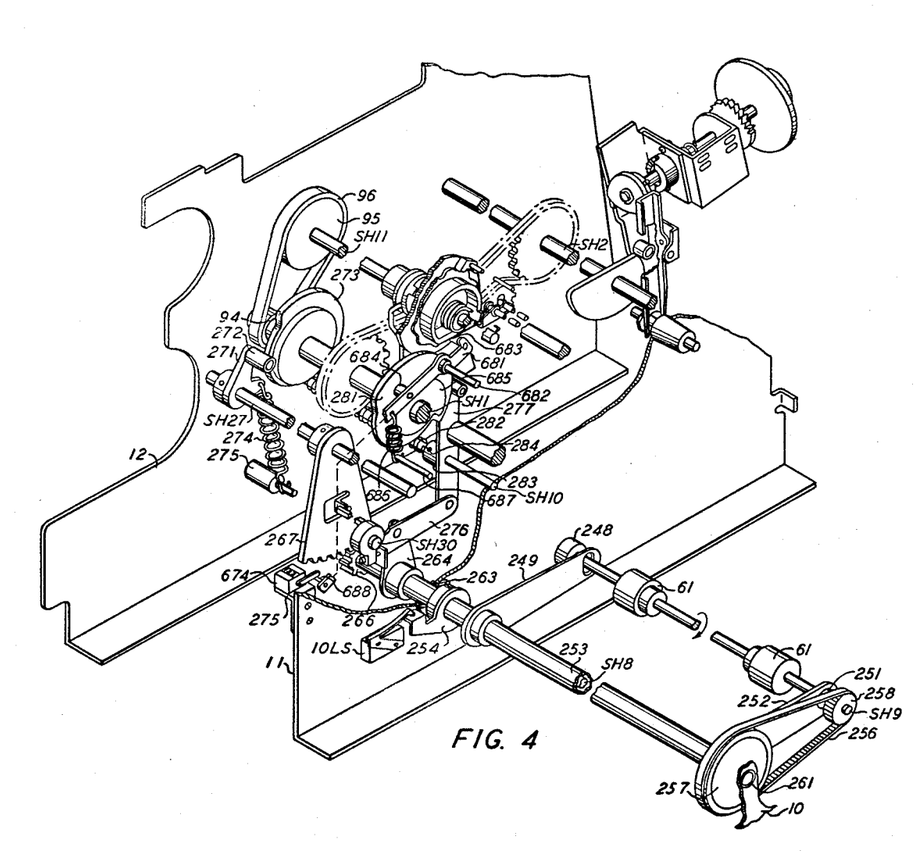
FIG. 4 is a left-hand perspective view of the mechanical control mechanism of the apparatus.

While the separator rollers are in contact with the topmost sheet, they are rotated in the direction shown by the arrow in FIG. 4 to separate the topmost sheet and forward it to guide 67. Shaft SH9, which supports the separator rollers, is operatively connected by means of the belt 256 to shaft SH8, as previously described. Shaft SH8 is intermittently driven by means of the pinion gear 266 secured thereon.

Figure 1:
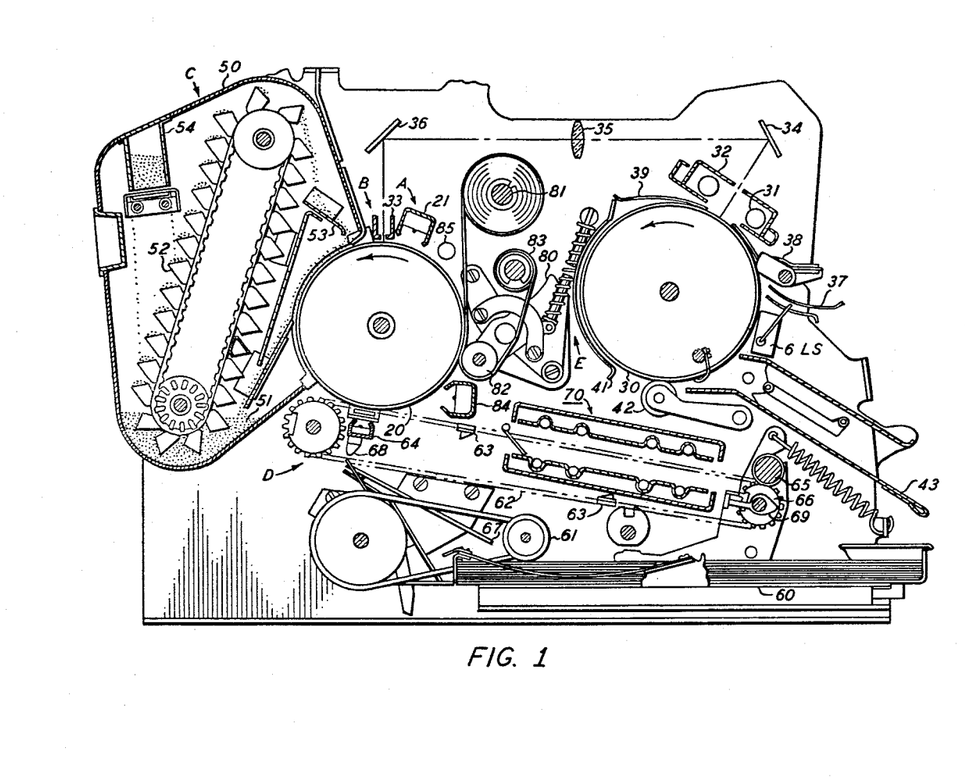
FIG. 1 is a schematic illustration of a xerographic reproducing apparatus using a counter mechanism constructed in accordance with the invention.
Figure 2:
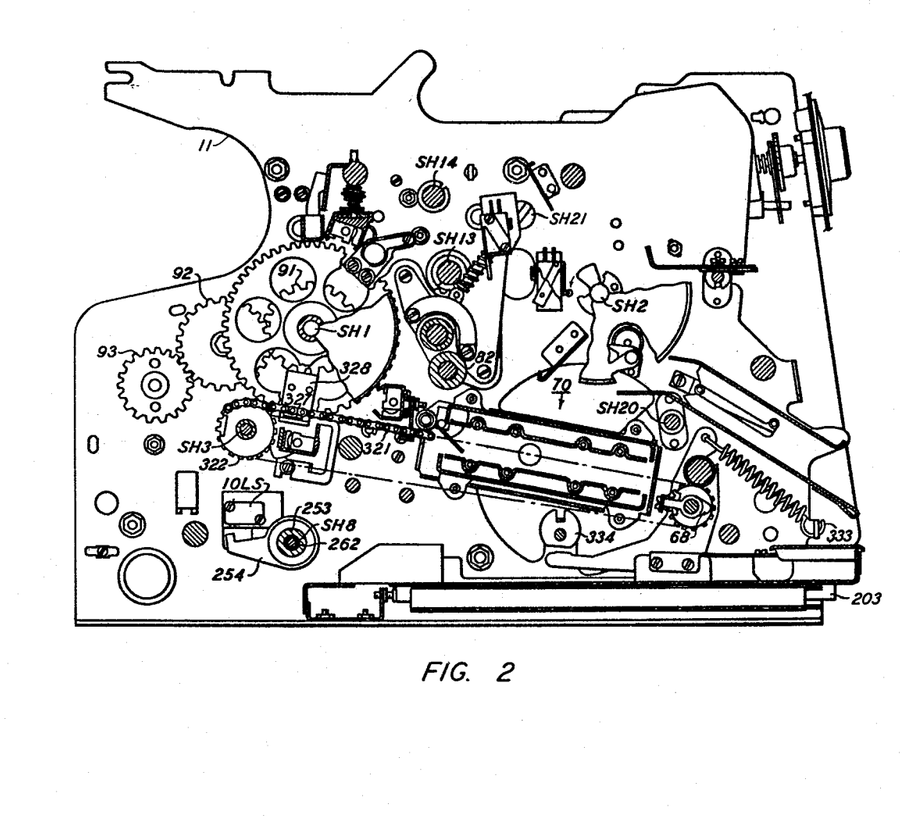
FIG. 2 is a sectional view of the xerographic reproducing apparatus taken on the xerographic components side of the intermediate frame plate of the apparatus.

Referring briefly to FIG. 1 it is apparent that as sheets are fed from the stack, each successive sheet must be advanced proportionally greater distance from the stack before its leading edge contacts the gate closing the egress opening of the guide 67.

Substantial uniform buckling of the sheets within the guide 67 is effected by means of a proportional paper feed mechanism. In this device, the shaft SH8 is rotated by the pinion gear 266 driven by an oscillating toothed quadrant. The toothed quadrant is oscillated by means of an arm having a cam follower thereon driven by a paper feed cam. The timing arrangement of this mechanism is such that rotation of the separator rollers to advance a sheet is accomplished while the separator rollers are resting on the topmost sheet of the stack. After the separator rollers are lifted off the stack, the toothed quadrant is returned to its normal position, for another sheet feed cycle, as determined by the null point of the paper feed cam or the height of the stack, causing the separator rollers to rotate in the reverse direction. Through a system of levers, an adjustable stop limits the return movement of the toothed quadrant as a function of the height of the stack in the paper tray. The result of this is that the period of duration of rotation of the separator rollers in contact with the paper is varied as a function of the height of the stack.

For rotating the pinion gear 266, there is provided a toothed quadrant 267 secured to shaft SH27 pivotally mounted in frame plates 11 and 12. The quadrant 267 is provided with teeth 268 at its lower end which mesh with the pinion gear 266.

The arm 271 fixed to shaft SH27 has a cam follower roller 272 rotatably mounted at one end. The cam follower roller 271 is actuated by paper feed cam 273 fixed to the drum shaft SH1, for oscillating the toothed quadrant 267. A spring 274 is connected at one end to stud 275 projecting from frame plate 12, and at its other end the spring is connected to the arm 271 to force the cam follower 272 toward the paper feed cam for engagement therewith.

Figures 5, 6, 7:
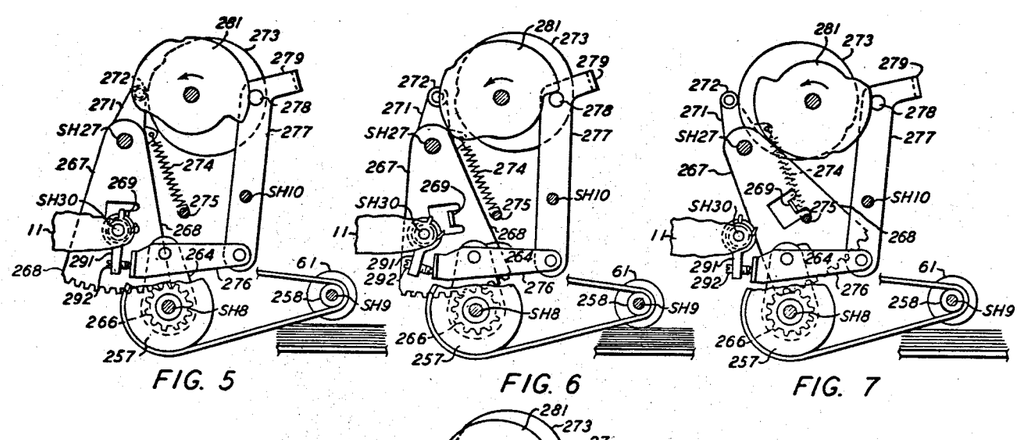
FIGS. 5, 6, and 7 are schematic illustrations of the paper separating and proportional feed mechanism showing the sequence of operation of these elements in full stack position.

The arrangement is such that upon each revolution of the paper feed cam 273, the spring 274 draws the arm 271 toward the right, as seen in FIGS. 6 and 7, causing rotary movement of the pinion gear 266 in a counter-clockwise direction, as seen in said figures, and that at another point in the revolution of the paper feed cam, the paper feed cam forces the arm 271 toward the left, as seen in these figures, to cause rotation of the pinion gear 266 in the opposite direction. Thus upon, rotation of the pinion gear 266, in one direction the separator rollers are driven in a clockwise direction for forwarding a sheet from the stack; and upon rotation of the pinion gear in the opposite direction, the rotation of the separator rollers is not effected to feed a sheet since they are raised by a roller control cam 281 and are therefore not in contact with the paper.

To effect feeding of a sheet as the separator rollers are rotated, the separator rollers are dropped into frictional contact with the topmost sheet of the stack in proper timed sequence with the actuation of the separator rollers for a feeding cycle.

This is accomplished by actuation of lever 264 fixed to torque tube 253 supporting the separator rollers. The lever 264 is pivotally connected to one end of link 276, the opposite end of link 276 being pivotally connected to one end of cam lever 277. Cam lever 277 secured to shaft SH10 journaled in frame plates 11 and 12, is provided with a rotatably mounted roller 278 and a latch portion 279 at its upper end. The roller 278 is actuated by roller control cam 281 to oscillate the lever 264 to effect a lowering or raising of the separator rollers.

In order to resiliently force the roller 278 toward the cam surface of roller control cam 281, a coil spring 282 encircles a portion of shaft SH10. One end portion of the coil spring is received by a suitable aperture in frame plate 12 and the opposite end portion of the coil spring is received by an aperture in collar 283, which is adjacently held on shaft SH10 by a set screw 284.

It is apparent that the null portion or fall of the roller control cam is so formed that the cam follower 278 will only contact this portion of the roller control cam when the separator rollers are in contact with the platform of the paper tray. Thus, with a full stack in the paper tray the follower 278 will be prevented from contacting the null portion of the roller control cam due to the linkage between the follower 278 and the separator rollers, as seen in FIG. 6.

In order to increase or decrease the torque applied by the coil spring 282 on the shaft SH10 and, therefore to increase or decrease the frictional contact of the separator rollers on the stack, the set screw 284 is loosened and the collar 283 rotated in the proper direction for increasing or decreasing the spring tension and then the set screw is again tightened.

Adjustment lever 291, journaled on stop shaft SH30 secured to frame plate 11, is provided with a side extending leg portion positioned to be in interference relationship with the stop portion 269 of toothed quadrant 267 as it is moved clockwise as seen in FIG. 3. The adjustment lever is also provided with a depending leg portion having a stop screw 292 adjustably secured therein in position to contact the turned-out leg portion of link 276.

Figure 8:
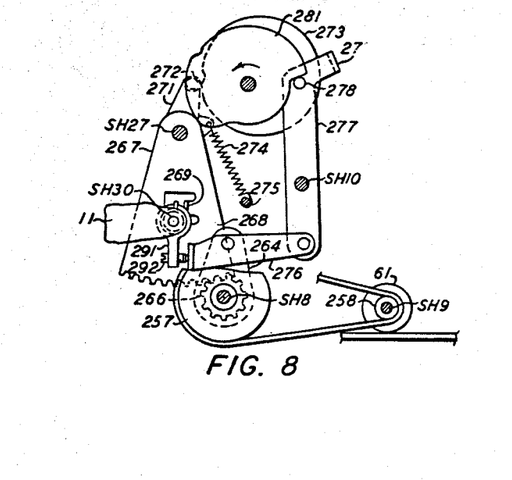
FIG. 8 is a view similar to FIG. 6, but in an empty stack position.

With this arrangement, the throw or angular displacement of the toothed quadrant, and therefore the number of gear teeth 268 engaging the pinion gear 266 during a feeding cycle, will be varied as a function of the stack height. As shown in FIG. 7, the movement of the toothed quadrant in a clockwise direction is limited by the rise of the paper feed cam 273, thus defining the limit of motion of the toothed quadrant in one direction. As shown in FIGS. 6 and 8, the effective position of the toothed quadrant at the start of an actual feed cycle is limited by the position of the extending leg portion of adjustment lever 291 as it contacts the stop portion 269 of toothed quadrant 267. The position of the extending leg portion of adjustment lever 291 is determined either by the height of the stack in the paper tray or the null portion of the roller control cam 281 through the control linkage described.

As shown in FIG. 6, the position of the toothed quadrant, when the separator rollers are in contact with the topmost sheet of a full stack, is such that only a portion of the teeth of the toothed quadrant will mesh with the pinion gear 266 during a feeding cycle whereas in FIG. 8, representing the position of the various elements when the separator rollers are in contact with the last sheet of a stack, the position of the toothed quadrant is such that all the gear teeth thereon will engage the pinion gear 266 during a feed cycle. With this driving arrangement, the rotational movement of the separator rollers is varied as a function of the stack height to effect proportional feeding of the sheets in the stack.

When the separator rollers are brought into contact with the topmost sheet in the supply tray and rotated in the direction shown, they will forward a sheet of support material into the guide 67 where its forward progress is stopped by the gate at the outlet of the guide. The separator rollers continue to rotate to feed the topmost sheet, causing the sheet to buckle in the guide for a purpose to be described in detail hereinafter.

*Machine Operation*

The xerographic drum is rotated at a constant speed by compound gear 91 fixed to the drum shaft SH1 carrying the xerographic drum, by a main drive motor MOT–3. Compound gear 91 engages compound idler gear 92 which is driven by gear 93 fixed to the shaft of the main drive motor MOT–3. The bucket-type conveyor and the toner dispenser of the developing apparatus 50 are suitably driven by a motor (not shown).

In the average office, it is generally necessary to make, at random intervals through the day, a single reproduction of an original, multiple reproductions of an original, or successive reproductions from successive originals.

To make a single reproduction, a copy is inserted into the machine through document guide 37 into contact with the copy drum 30.

As the document is inserted in the document guide, its leading edges will actuate limit switch 6–LS, positioned beneath the document guide with its actuator extending through a suitable aperture in the document guide, to thereby close its contact to complete a circuit to initiate operation of the machine. That is, at this time the main drive motor MOT–3 is energized to rotate the xerographic drum 20, the copy drum 30 and the sheet conveyor mechanism 62. The motor used to effect operation of the developer mechanism 35 and toner dispenser 37 is also energized.

At the exposure station, the exposure lamps are energized; and power is also supplied to effect operation of the corona charging device 21, the corona transfer device 64 and the corona pre-cleaning device 84.

Now as the xerographic drum 20 rotates under corona charging device 21, a uniform electrostatic charge is deposited on the photoconductive layer of the drum. As the xerographic drum rotates through the exposure station a light or radiation pattern of the copy carried on the rotating copy drum 30 is projected, by means of the mirror and lens assembly previously described, onto the surface of the drum to dissipate the charge on the drum in accordance with the light or radiation pattern of the copy, thereby forming a latent electrostatic image of the copy on said xerographic drum.

The exposed portion of the drum then rotates to the developing station C, where an xerographic developing material including toner particles having an electrostatic charge are cascaded over the drum surface whereby the toner particles adhere to the electrostatic latent image to form a xerographic powder image in the configuration of the copy. The exposed and developed portion of the xerographic drum then advances to the image transfer station D where it receives a sheet of support material advanced by the conveyor. As the drum surface and sheet of support material pass over the corona transfer device 64, the developed powder image is transferred electrostatically from the xerographic drum surface to the sheet of support material. The xerographic drum then continues to rotate past the precleaning corona device 84, then to the web cleaning device whereat any residual powder on the drum surface is removed by the web, and then under the discharge lamp whereat any residual charge on the drum is dissipated by radiation from this lamp.

In the meantime, the copy drum has rotated at a corresponding rate of speed whereby it will have rejected any copy, if the interposer pin is in position to cause the ejection of copy, and the copy drum is then ready to receive a second copy, or if the copy is to be retained on the copy drum, it is ready to be advanced through the exposure station again. Assuming that only a single reproduction of a single copy is being made, the copy will have been ejected from the machine and the xerographic powder image will be transferred to the sheet of support material during the one cycle of rotation of the xerographic drum and copy drum. However, at this point in the operation of the apparatus the sheet of support material, with the powder image transferred thereto, has not been ejected from the machine.

The operating cycle of the apparatus disclosed is such that it requires three cycles of rotation of the xerographic drum and the copy drum to effect one and one-half cycles of rotation of the sheet conveyor mechanism. In the embodiment of the apparatus shown, the pitch length of the chain of the sheet conveyor is twice the circumference of the xerographic drum, so for three revolutions of the xerographic drum the chain makes one and one-half revolutions.

Thus, after the transfer step, even though a second reproduction is not to be made, the xerographic drum and the copy drum must rotate through a second and third revolution to permit the sheet conveyor mechanism to eject a sheet of support material from the machine. However, during the second and third revolution of the xerographic drum and the copy drum, still assuming that only a single reproduction is being made, the optical system will, in effect, scan a blank copy drum and project a radiation image from the copy drum onto the xerographic drum, to expose the xerographic drum to this image of the copy drum. The xerographic drum will then again pass through the developing station and through the transfer station as previously described; however, a latch mechanism has now engaged the cam lever 277 to prevent advancement of a sheet of transfer material from the paper tray to the xerographic drum. As the xerographic drum continues to rotate through the second and third cycle it will again be cleaned as it passes through the cleaning station E and thus made ready for an actual reproducing cycle.

The continued operation of the sheet conveyor, copy drum and xerographic drum is effected by means of a time out cam which, when actuated by the latch mechanism, operates in time sequence to the rotation of the xerographic drum so that sufficient time is allowed to permit the xerographic drum to rotate through the required cycles before the main drive motor is de-energized, thereby enabling the sheet conveyor mechanism and the delivery rollers, to eject the reproduction from the machine.

As shown in FIGS. 4, 9, 10 and 11, the time out cam 630 is mounted on shaft SH11 journaled in frame plates 11 and 12. The time out cam is journaled on shaft SH11 for rotation relative to the shaft and is maintained axially thereon by a retaining ring 645 positioned in a suitable groove formed on the shaft. Shaft SH11 is operatively connected to drum shaft SH1 by belt 96, which runs on pulleys 95 and 94, fixedly mounted on shaft SH11 and SH1, respectively, whereby the shaft SH11 is rotated at approximately one-third the rotative speed of shaft SH1.

The time out cam is provided on one face thereof with cam surfaces 631 and 632 formed concentric with each other, these cam surfaces being used to actuate a multicopy delivery limit switch 12LS and a main drive limit switch 9LS, respectively. On its peripheral surface adjacent to these cam surfaces, the time out cam is provided with a cam surface 633 adapted to actuate a limit switch 8LS. Limit switches 9LS and 12LS are mounted on support 646 and limit switch 8LS is mounted on support 647, both supports being secured to frame plate 11.

The time out cam is rotated, during the timing out cycle, in the same direction and in synchronism with the drum shaft by the clutch slide 640 mounted on shaft 11. The time out cam and the clutch slide form a dog clutch, that is, the clutch slide is provided with a lug 641 adapted to engage one of the slots 634 formed on the raised annular inner portion of the time out cam, and the clutch slide is slidable axially on shaft SH11 for engaging the time out cam.

The clutch slide 640 is secured for rotation with shaft 11 by engagement of radial pin 644, carried by the shaft, with the longitudinal slot 642 provided in the hub end of the clutch slide. Clutch slide 640 is provided with an annular groove 643 adapted to receive the latch lever of the latch mechanism, described hereinafter, whereby the clutch slide may be selectively moved into or out of engagement with the time out cam.

To effect rotation of the time out cam in the opposite direction, there is provided a return spring 651 encircling the hub of the time out cam. One end of the return spring is received by an opening in frame plate 11 and the opposite end portion of the return spring is received by a suitable opening in the time out cam.

It is noted that the size of the return spring is such that, when the spring is in its normal expanded condition, it may be contracted when the time out cam is rotated in a counterclockwise direction, as seen in FIG. 3, whereby sufficient energy is stored up by the spring to rotate the time out cam in a clockwise direction when the drive force, i.e., the clutch slide 640, rotating the return spring in a counterclockwise direction is released.

Figure 10:
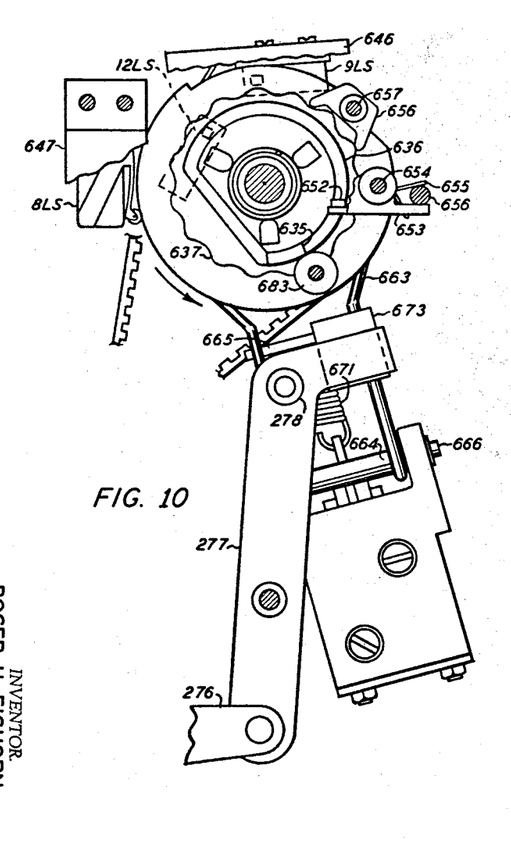
FIG. 10 is a sectional view taken along line 10—10 of FIG. 9.
Figure 11:
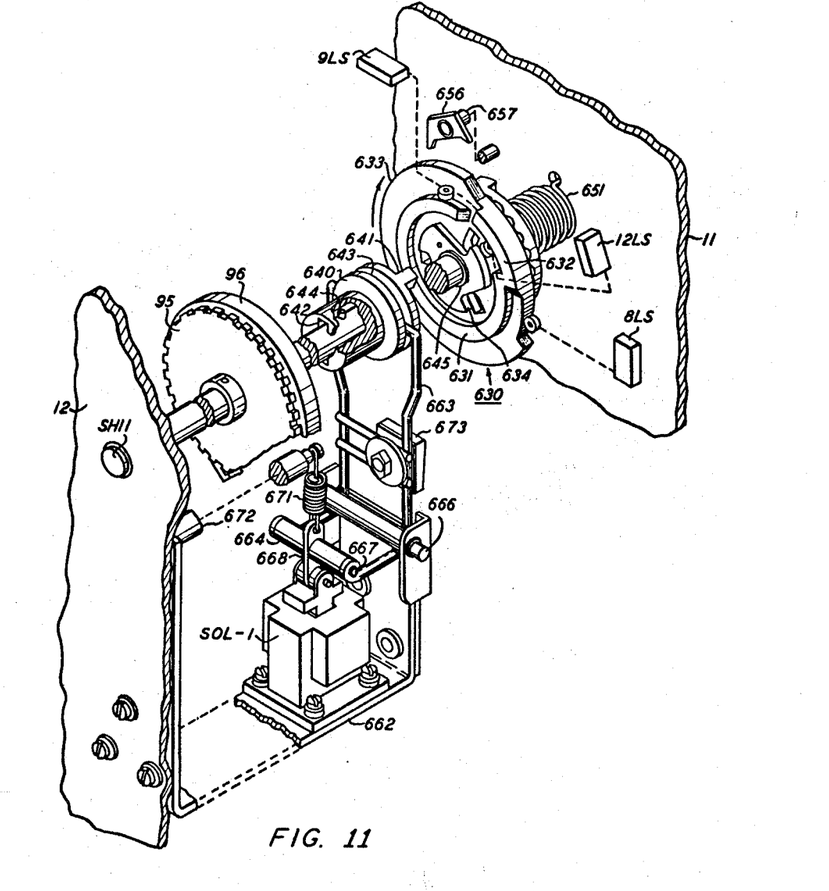
FIG. 11 is a right-hand perspective view of the time out cam assembly viewed from the back of the machine.

The rotation of the time out cam in a clockwise direction, as seen in FIGS. 3 and 10, is limited by engagement of the stop lug 635 extending axially from the billing counter cam 636 also formed on the time out cam, with the bumper 652 on the end of the cam stop lever 653. The cam stop lever is journaled on stub shaft 654 secured to frame plate 11 and is normally biased by spring 655 in a counterclockwise direction, as seen in the above figures, into contact with the stop pin 656 fixed to frame plate 11.

To retard the motion of the time out cam as it is rotated in a clockwise direction by the return spring, there is provided on the time out cam a toothed escapement wheel portion 637, the teeth of which cooperate with an oscillating member 656 pivotally supported on spindle 657. With this arrangement, the inertia of the time out cam as it is returned to its home position, as determined by the engagement of the stop lug against the bumper, is partly absorbed by the oscillating member, and not entirely by the stop lug 635 as it strikes the bumper 652.

The latch mechanism used to prevent advancement of sheet transfer material during the timing out cycle of the machine and to effect operation of the time out includes a clutch lever bracket 661 fastened to a U-shaped bracket 662 secured to frame plate 12. A forked actuator lever which consists of two L-shaped levers 663 held in spaced relation to each other by spacer 664 and by rod 665, is pivotally mounted on pivot pin 666 positioned in the clutch lever bracket 661. As shown, spacer 664 encircles pivot pin 666.

The levers 663, at one end, engage the annular groove 643 in clutch slide 640, and at the other end are engaged by pivot 667 positioned in the link 668. Link 668 is connected at one end to the bifurcated plunger of the normally open, cam release solenoid SOL-1 fastened to bracket 662.

At its other end, link 668 is provided with an opening to receive one end of spring 671, the opposite end of the spring being secured to spring pin 672 extending from a leg of bracket 662, whereby the levers are normally biased in a counterclockwise direction, as seen in FIG. 38, to force the clutch slide into engagement with the time out cam.

Figure 9:
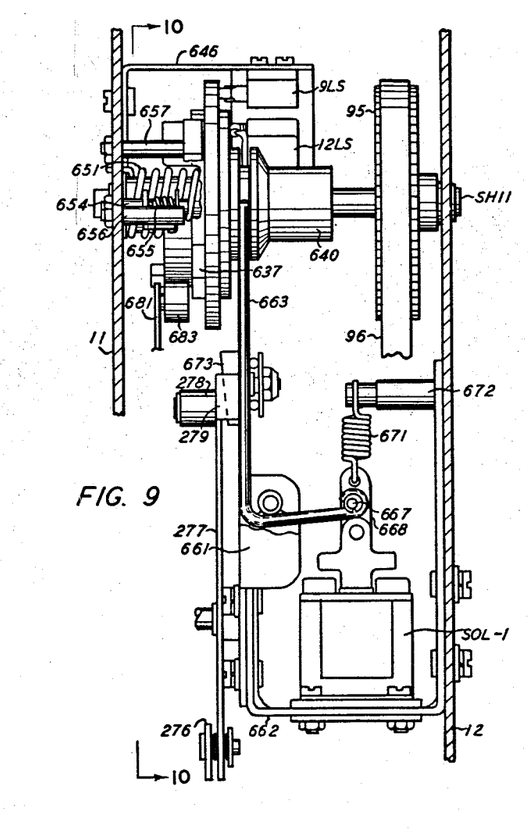
FIG. 9 is a front view of the time out cam and time out latch assembly.

A latch 673 is fixed to the forked actuator lever in position to engage the latch portion 279 of cam lever 277 whereby when the cam release solenoid SOL-1 is de-energized as shown in FIGS. 3, 9 and 10, the latch 673 engages the latch portion 279 of cam lever 277 to lock this lever in an inoperative position. When the cam lever 277 is in its inoperative position, the roller 278, thereon, is raised out of engagement with the roller control cam 281 on drum shaft SH1 thereby preventing the separator rollers 61 from being dropped into contact with the stack of support material in the paper tray. In this manner, although the separator rollers are rotated to advance a sheet during each rotative cycle of the xerographic drum, sheet material is not advanced as the xerographic drum is rotated during the timing out cycle of the machine.

To permit an operator to determine the number of reproductions made during a period of time, for example a day, there is provided a conventional mechanically actuated counter 674 mounted on bracket 675, secured to frame plate 11 at the rear of the machine, in position to be accessible to an operator.

Since the number of revolutions of the xerographic drum and the elements related thereto will vary, depending on the number of reproductions made, because of the two additional rotative cycles of the xerographic drum while the machine is timing out, it is apparent that a count of the number of revolutions made by the xerographic drum in a period of time would not be a true indication of the number of reproductions made during the period of time.

The only accurate indication of the number of reproductions made during a period of time, is the number of sheets of support material advanced into transfer contact with the drum in the specified period.

To count the number of sheets advanced, there is provided a lever mechanism to actuate the counter only during an actual feeding cycle or reproducing cycle, but not during the timing out cycle.

As shown in FIGS. 3 and 4, there is provided a counter lever 681 pivotally mounted on stub shaft 682 secured to frame plate 11.

A pair of cam followers 683 and 684 are journaled on the counter lever on the opposite sides of its pivot axis, cam follower 683 being adapted to be actuated by billing counter cam 636 formed on time out cam 630 and cam follower 684 being adapted to be actuated by counter cam 685 fixed to the drum shaft SH1.

A spring 686 is connected at one end to the counter lever 681 and at its other end to a stud 687 extending from frame plate 11 to force the cam followers 683 and 684 toward their respective cooperating cams.

A drive pin 688, secured to the end of counter lever 681 opposite cam follower 683, is engaged in a suitable aperture in the actuating lever of the counter 674 whereby the counter is actuated as the counter lever is oscillated.

During a reproducing cycle, as a sheet is advanced by the paper feed mechanism previously described, the cam follower 684 by engagement with counter cam 685 will cause the counter lever to be rotated in a clockwise direction, as seen in FIG. 3, to actuate the counter. During the reproducing cycle, the time out cam 630, which has previously been released, is in its home position with the fall of the billing counter cam 636 adjacent the cam follower 683 on the counter lever.

When the time out cam is rotated during the timing out cycle, to the position shown in FIG. 3, the rise of the billing counter cam 636 will engage the cam follower 683 on the counter lever to raise cam follower 684 out of the counter during the period of time when the separator rollers are prevented from contacting the stack for advancing a sheet, as previously described.

In the machine stand-by condition, the cam release solenoid SOL-1 is de-energized thereby permitting the spring 671 to bias the levers 663 in position to maintain the clutch slide 640 in engagement with the time out cam 630, and to latch up the separator rollers 61 through the linkage previously described. In the stand-by condition, the time out cam 630 is in its extreme position rotatively, as shown in FIG. 3.

The time out cam, when in this position, actuates the limit switches 8LS, 9LS and 12LS for a purpose which need not be described in detail herein, since this is fully disclosed in the referenced copending Eichorn et al. application Serial No. 162,837. As the cam release solenoid SOL-1 is energized, it will, through the action of levers 663, pull the clutch slide 640 out of engagement with the time out cam 630 thereby permitting the time out cam to rotate back to its home position by the action of the return spring 651, as previously described.

As the time out cam returns to its home position, the respective cam surfaces thereof will ride off the actuators for limit switches 8LS, 9LS and 12LS. At this time, the main drive motor MOT-3 is energized to rotate the xerographic drum 20, the copy drum 30 and the sheet conveyor mechanism 62. With the opening of switch 9LS, the cam release solenoid SOL-1 is de-energized.

When the cam release solenoid SOL-1 is energized to release the clutch slide 640, it will also unlatch the cam lever 277 whereby its rollers 278 will drop onto the surface of the paper feed cam 273.

The machine is now operating to effecting a document reproducing cycle and to effect a paper feed cycle as determined by the paper feed mechanism as previously described. The feeding of each sheet of paper is recorded on the counter 674 through the mechanism previously described.

When the cam release solenoid SOL-1 was energized, it caused the release of the cam lever 277 thereby allowing the roller 278 thereon to engage paper feed cam 273. When the cam release solenoid SOL-1 is de-energized upon the opening of contact 9LS, the lever 663 of the latch mechanism will be biased by spring 671 in a counterclockwise direction, as shown in FIG. 9, but its movement will be arrested by latch portion 279 of cam lever 277 contacting the face of latch 673. With the movement of lever 663 thus arrested, the clutch slide 640 will not have been moved sufficiently to the left, as shown in the above figure, to permit the lug 641 of the clutch slide, to engage one of the slots 634 of time out cam 630.

At the end of a paper feed cycle, the paper separator rolls are raised by the paper feed cam, and as the roller 278 rises on the paper feed cam 273 the latch portion 279 of cam lever 277 will ride off the face of latch 673 to be engaged by the latch. As the latch portion 279 rides off the face of latch 673, the levers 663 can be biased by spring 671 to their extreme counterclockwise position whereby the clutch slide 640 will be shifted sufficiently to the left, to the position shown in FIG. 9, to engage the time out cam 630 for effecting rotation of the time out cam. The engagement or latching up of the cam lever 277 prevents the paper feed system from feeding additional sheets. At the same time the cam follower 684 on counter lever 681 will be raised out of engagement with counter cam 685 through the rotation of billing counter cam 636 which then engages cam follower 683 on the counter lever.

Upon continued rotation of the time out cam 630, the time out cam when it reaches its stand-by position, as shown in FIG. 3, will actuate limit switch 9LS thereby de-energizing the main drive motor MOT-3 and associated elements. The machine is once again in a stand-by position and a reproducing cycle can be initiated again merely by inserting a document into the document guide to close the document sensing switch 6LS whereupon the cam release solenoid SOL-1 will again be energized to initiate another reproducing cycle.

In the event that another document, a second document, is inserted into the machine soon after the first document has been gripped onto the copy drum, the document sensing switch 6LS will be held in a closed position by the second document allowing the machine to reset to make the second or successive reproductions with each feeding of a sheet of paper on which the reproductions are made being recorded on the counter.

As described in the above reference Eichorn et al. application, the xerographic apparatus disclosed therein is also provided with control means to effect continued operation when it is desired to make multiple reproductions of a single document. In each instance, the xerographic drum and the copy drum must rotate through at least two full cycles of rotation in addition to the cycle or cycles of rotation required to make the desired number of reproductions. Thus to make a single reproduction, these drums rotate through three cycles of rotation and to make five reproductions the drums rotate through at least seven cycles of rotation.

Since applicant's counter mechanism is so constructed to count only the actual sheet feeding cycles it can function independently of the number of drum cycles required to make a predetermined number of reproductions.

While the invention has been described with reference to the structure disclosed herein, it is not confined to the details set forth, and this application is intended to cover such modifications or changes as may come with the purpose of the scope of the following claims.

What is claimed:

1. A counter mechanism for a reproducing apparatus having a drum journaled in a frame for rotation through at least one revolution to effect a reproducing cycle and through at least a second revolution to effect a timing out cycle, and a paper feed mechanism to advance sheet material on which the reproductions are to be made to the drum, said counter mechanism including
    a counter cam operatively connected to said drum for rotation therewith,
    cam means positioned to be moved to a first position during a reproducing cycle and to a second position during a timing out cycle,
    clutch means connected to said cam means to effect movement of said cam means,
    a counter,
    a lever pivotally connected intermediate its ends to said frame and connected at one end to said counter,
    a first cam follower connected to said lever between the pivotal axis of said lever and the end of said lever connected to said counter, said first cam follower being positioned to be engaged by said counter cam,
    a second follower connected to the opposite end of said lever in position to contact said cam means, and
    spring means connected to said lever and to said frame for normally biasing said first cam follower into engagement with said counter cam.

2. A counter mechanism for a xerographic reproducing apparatus having a xerographic drum journaled in a frame for rotation through at least one revolution to effect a reproducing cycle and through at least a second revolution to effect a timing out cycle, and a paper feed mechanism for advancing sheet material on which the reproductions are to be made to the xerographic drum, said counter mechanism including
    a counter cam operatively connected to said xerographic drum for rotation therewith,
    a counter,
    a lever pivotally connected intermediate its ends to said frame, said lever being connected at one end the said counter,
    a first cam follower connected to said lever between the pivotal axis of said lever and the end of said lever connected to said counter, said first cam follower being positioned on said lever to be engaged by said counter cam,
    spring means connected to said lever and to said frame for normally biasing said first cam follower into engagement with said counter cam,
    cam means positioned to be moved to a first position during a reproducing cycle and to a second position during a timing out cycle,
    clutch means rotated in timed relation to said xerographic drum and connected to said cam means to effect movement of said cam means, and
    a second cam follower connected to the opposite end of said lever from said counter in position to contact said cam means,
    said cam means when in said first position permitting said first cam follower to be engaged by said counter cam and when in said second position to rotate said lever by means of said second cam follower to a position whereby said first cam follower is positioned out of interference relation to said counter cam.

3. A counter mechanism for a reproducing apparatus having a drum journaled in a frame for rotation through at least one revolution to effect a reproducing cycle and through at least a second revolution to effect a timing out cycle, and a paper feed mechanism for advancing sheet material on which the reproductions are to be made to the drum, said counter mechanism including
    a counter cam operatively connected to said drum for rotation therewith,
    cam means positioned to be moved to a first position during a reproducing cycle and to a second position during a timing out cycle,
    clutch means connected to said cam means to effect movement of said cam means,
    a counter,
    a lever pivotally connected to said frame and connected at one end to said counter,
    a first cam follower connected to said lever in position to be engaged by said counter cam,
    a second cam follower connected to said lever in position to be engaged by said cam means, and
    spring means connected at one end to said lever and at its other end to said frame for normally biasing said first cam follower into engagement with said counter cam,
    said counter cam being provided with a rise portion to normally move said lever in one direction and a fall portion to allow said lever to be moved in an opposite direction by said spring means, and
    said cam means when in said first position permitting said first cam follower to be engaged by said counter cam and when in a second position to rotate said lever into position whereby said first cam follower is positioned out of interference relation to said counter cam.

No references cited.